（12） United States Patent
Schroth et al.

(10) Patent No.: US 10,036,083 B2
(45) Date of Patent: Jul. 31, 2018

(54) REACTION MATERIAL PRE-PLACEMENT FOR REACTION METALLURGICAL JOINING

(71) Applicant: GM GLOBAL TECHNOLOGY OPERATIONS LLC, Detroit, MI (US)

(72) Inventors: James G. Schroth, Troy, MI (US); Thomas A. Perry, Bruce Township, MI (US); Chen Zhou, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 492 days.

(21) Appl. No.: 14/789,134

(22) Filed: Jul. 1, 2015

(65) Prior Publication Data

US 2016/0008911 A1 Jan. 14, 2016

Related U.S. Application Data

(60) Provisional application No. 62/021,740, filed on Jul. 8, 2014.

(51) Int. Cl.
| | | |
|---|---|---|
| *C22C 9/00* | (2006.01) | |
| *B23K 9/04* | (2006.01) | |
| *B23K 35/30* | (2006.01) | |
| *B23K 20/16* | (2006.01) | |

(52) U.S. Cl.
CPC ............. *C22C 9/00* (2013.01); *B23K 9/042* (2013.01); *B23K 20/165* (2013.01); *B23K 35/302* (2013.01)

(58) Field of Classification Search
CPC .... B23K 20/165; B23K 35/302; B23K 9/042; B23K 20/16; B23K 9/04; C22C 9/00
See application file for complete search history.

(56) References Cited

U.S. PATENT DOCUMENTS

| 8,523,045 B2 | 9/2013 | Perry et al. | |
|---|---|---|---|
| 8,590,768 B2 | 11/2013 | Sigler et al. | |
| 2010/0247955 A1* | 9/2010 | Takahashi | B23K 1/0016 428/647 |
| 2012/0288401 A1* | 11/2012 | Cho | C22C 9/00 420/472 |
| 2013/0056447 A1 | 3/2013 | Perry et al. | |
| 2015/0021815 A1* | 1/2015 | Albrecht | B05B 5/001 264/235 |
| 2016/0008912 A1* | 1/2016 | Schroth | B23K 35/302 219/118 |
| 2017/0297137 A1* | 10/2017 | Perry | B23K 11/20 |

FOREIGN PATENT DOCUMENTS

| CN | 102049591 A | 5/2011 |
|---|---|---|
| CN | 102310287 A | 1/2012 |

OTHER PUBLICATIONS

Zang, Hong-Tao, et al.; Energy input and metal transfer behavior of CMT welding process; Materials Science & Technology; vol. 20; No. 2; Apr. 2012.

* cited by examiner

*Primary Examiner* — Geoffrey S Evans
(74) *Attorney, Agent, or Firm* — Reising Ethington P.C.

(57) ABSTRACT

A method of pre-placing a reaction material onto a surface of a metal workpiece substrate involves the use of oscillating wire arc welding. The method involves depositing and adhering the reaction material from a consumable electrode rod. In doing so, the reaction material can be deposited at any time before the metal workpiece substrate is ready for joining by reaction metallurgical joining, and the size and shape of the reaction material deposit can be more easily controlled.

20 Claims, 3 Drawing Sheets

REACTION MATERIAL PRE-PLACEMENT FOR REACTION METALLURGICAL JOINING

CROSS-REFERENCE TO RELATED APPLICATION

This application claims the benefit of U.S. Provisional Application No. 62/021,740 filed on Jul. 8, 2014. The entire contents of that application are incorporated herein by reference.

TECHNICAL FIELD

The technical field of this disclosure relates generally to reaction metallurgical joining of metal workpiece substrates and, more particularly, to pre-placement of a reaction material on the faying surface of at least one of the metal workpiece substrates.

BACKGROUND

Reaction metallurgical joining is a process in which a reaction material is heated and compressed between two metal workpiece substrates to facilitate the formation of a metallurgical joint between the substrates. The reaction material, in particular, is formulated to have a liquidus temperature below the lowest solidus temperature of the two metal workpiece substrates being joined and, additionally, to be reactive with the opposed faying surfaces of the workpiece substrates when disposed between those surfaces and heated above its solidus temperature. After being heated above at least its solidus temperature (and beforehand if desired), a compressive force is applied to the workpiece substrates, which squeezes and laterally spreads the reaction material, including any reaction by-products, along the faying interface of the workpiece substrates. The faying surfaces join together at this time to establish a low-resistivity solid-state metallurgical joint composed mainly of the base workpiece materials as the applied compression substantially expels the reaction material from the joint.

The reactivity of the reaction material enables coalescence without having to melt the metal workpiece substrates. Indeed, during reaction metallurgical joining, the reaction material forms a mobile liquid phase when heated above its solidus temperature, while melting of the facing workpiece substrates is typically avoided. This liquid phase breaks down surface films and materials—such as oxide films—present on the faying metal workpiece surfaces to expose clean portions of the faying surfaces, and can also locally dissolve a skin layer of each faying surface to make them temporarily more amenable to coalescence. The compressive force applied to the metal workpiece substrates—in addition to expelling the reaction material and any reaction by-products—eventually brings the cleaned portions of opposed faying surfaces into direct contact under pressure. A solid-state metallurgical joint ultimately results between the contacting coalescing portions of the opposed faying surfaces. Any leftover residual amounts of the reaction material still present at the faying interface simply re-solidify without substantially impacting the joint properties.

The heat input required to join the metal workpiece substrates by reaction metallurgical joining is relatively low compared to other joining techniques such as MIG welding, TIG welding, laser welding, and resistance spot welding, among others. Unlike those and other welding processes, which intend to generate enough heat to initiate melting of the base metals, reaction metallurgical joining can attain a solid-state joint directly between the metal workpiece substrates without having to generate such heat. As previously explained, reaction metallurgical joining inputs only enough heat to initiate melting of the reaction material, which in turn reacts with the workpiece substrate faying surfaces to initiate coalescence at a temperature below the temperature at which either of the workpiece substrates will begin to melt. The use of reaction metallurgical joining is thus an attractive option when heat-sensitive materials are located in close proximity to the metal workpiece substrates sought to be joined, particularly when carried out with resistive heating derived from cooled electrodes.

While reaction metallurgical joining has the ability to form a quality solid-state metallurgical joint with a minimal heat input, its use in a manufacturing setting raises some practical challenges. For instance, current conventional practices typically rely on manual placement of the reaction material between the opposed workpiece substrate faying surfaces. Such placement usually calls for an individual to manipulate a tape or foil of the reaction material with a hand tool, like a clamp or tweezers, just prior to heating and compression of the interposed reaction material. While these manual techniques have worked, and may indeed be useful in some circumstances, there are instances in which a quicker, more flexible, and easier to control reaction material placement technique may be desired.

SUMMARY OF THE DISCLOSURE

A method of pre-placing a reaction material on a faying surface of a workpiece substrate to be joined by reaction metallurgical joining is disclosed. The method involves using oscillating wire arc welding to deposit and adhere the reaction material onto the workpiece substrate faying surface from a consumable electrode rod comprised of the reaction material. By employing oscillating wire arc welding, a controlled amount of the reaction material can be consistently deposited in a particular location. Oscillating wire arc welding also permits control of the size and shape of the deposited reaction material, meaning that the reaction material can be deposited to have an aspect ratio, which compares the height to the base diameter of the deposited material, of 0.5 or more. Reaction material deposits satisfying this relationship have been shown in certain circumstances to lead to higher quality metallurgical joints between the workpiece substrates than flatter deposits.

Moreover, because oscillating wire arc welding adheres the reaction material to the workpiece substrate faying surface, the reaction material does not have to be deposited just before commencement of the actual reaction metallurgical joining process. In fact, if desired, the reaction material can be deposited long before the corresponding workpiece substrate is expected to undergo reaction metallurgical joining, and it can even be deposited in a remote location and stored along with the workpiece substrate for long periods of time. Such process flexibility even permits the deposition of the reaction material to be carried out on dedicated equipment completely independent from the reaction metallurgical joining equipment. When the use of dedicated and independent equipment is available, the equipment fixture and related process mechanics (e.g., process controls, cooling, etc.) can be specifically tailored to the reaction material pre-placement, which promotes process reliability and efficiency.

The pre-placement of the reaction material using oscillating wire arc welding can be used to prepare a variety of metal workpiece substrate combinations for reaction metallurgical joining. In one embodiment, a specific example of which is described below, each of the two metal workpiece substrates may be a phase lead tab of an electric motor stator that is composed of copper. Oscillating wire arc welding can, of course, be used with other metal workpiece substrates. For instance, each of the metal workpiece substrates may be composed of a copper alloy that contains 96 wt. % or greater of Cu along with 0-4 wt. % of one or more alloying elements such as Cd, Cr, Zr, Mg, Fe, P, Be, Co, S, Te, and Pb. As another example, each of the metal workpiece substrates may be composed of a non-copper-based metal or alloy, such as steel or an aluminum alloy. Skilled artisans will know and appreciate the different types of reaction materials that can be employed with the many different metal workpiece substrate combinations that are conducive to reaction material pre-placement by way of oscillating wire arc welding.

DETAILED DESCRIPTION

Preferred and exemplary embodiments of a method of pre-placing a reaction material for eventual participation in reaction metallurgical joining are shown in FIGS. 1-8 and described below. While the embodiments described here deposit a specific copper-based reaction material alloy on a copper workpiece substrate to facilitate reaction metallurgical joining of two copper workpiece substrates, it should be understood that this particular description represents only one possible implementation. Oscillating wire arc welding may indeed be used to deposit different kinds of reaction material formulations onto the copper workpiece substrate, or onto other metal workpiece substrates for that matter, despite not being explicitly described here.

Figure 1:
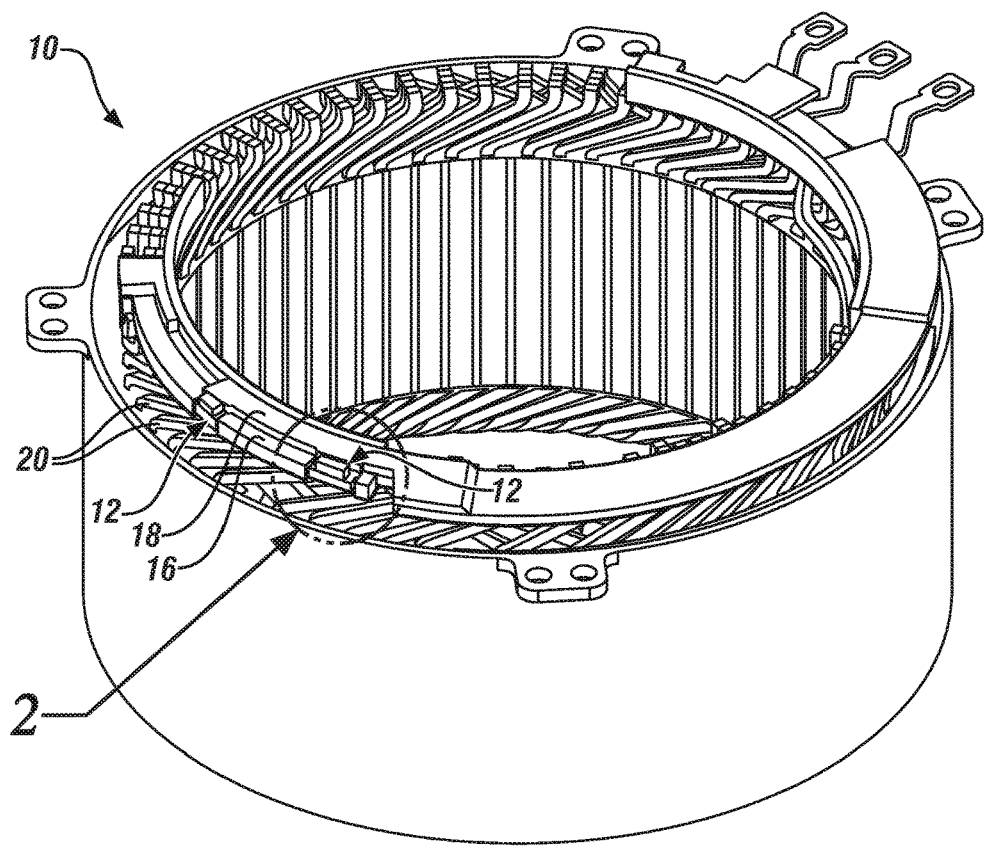
FIG. 1 is a perspective view of a stator of an electric motor, wherein the stator includes multiple sets of confronting copper phase lead tabs.
Figure 2:
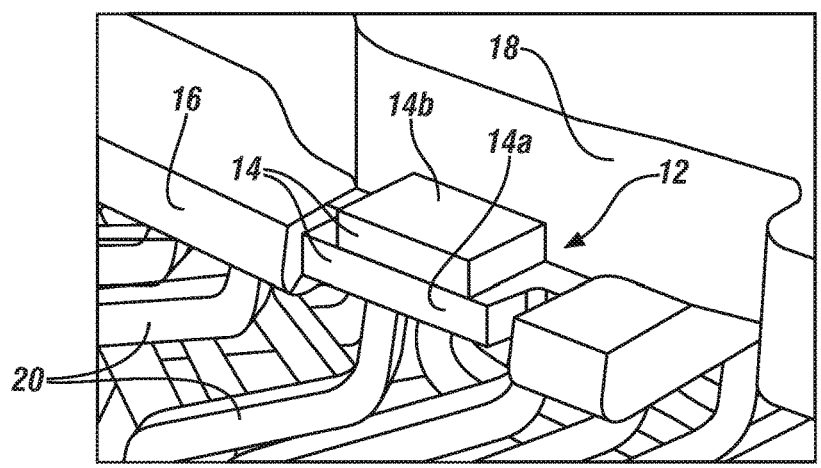
FIG. 2 is a magnified perspective view of one of the sets of phase lead tabs depicted in FIG. 1.

Reaction metallurgical joining can be employed to establish a solid-state metallurgical joint between two copper workpiece substrates, especially if either or both of the substrates are in close proximity to heat-sensitive materials. For example, as shown in FIGS. 1-2, a stator 10 of an electric motor may include multiple sets 12 of confronting phase lead tabs 14. The confronting phase lead tabs 14 in each set 12 typically must be joined in a way that ensures mechanical stability and good electrical communication between the tabs 14. An enlarged view of one of the phase lead tab sets 12 is shown in FIG. 2. There, a first phase lead tab 14a and a second phase lead tab 14b are provided by a first polymer ring carrier 16 and a second polymer ring carrier 18, respectively. The first phase lead tab 14a electrically communicates with a plurality of copper wires 20 of a stator winding that extend between steel laminations disposed on the inner circumference of the stator 10, and the second phase lead tab 14b is the protruding end of a copper conductor with the adjacent extending portion of the conductor embedded in the second polymer ring carrier 18 and hidden from view. Each of the first and second phase lead tabs 14a, 14b is preferably constructed from high-purity copper (i.e., greater than 99.9 wt. % Cu). The use of reaction metallurgical joining to unite the confronting copper tabs 14a, 14b makes sense given that the enamel used to insulate the copper wires 20 and the polymer material of the first and second polymer ring carriers 16, 18 are susceptible to thermal degradation.

Before the phase lead tabs 14a, 14b are joined, a reaction material is deposited on one or both of the tabs 14a, 14b by oscillating wire arc welding, as depicted in FIGS. 3-7. To begin, as shown best in FIG. 3, the reaction material is initially packaged as a consumable electrode rod 22 that has a leading tip end 24. The reaction material electrode rod 22 protrudes from a guide nozzle 26 and is reciprocally moveable along its longitudinal axis A. The reaction material electrode rod 22 is also connected to a welding power supply (not shown) by an electrode cable. Likewise, to complete the arc welding circuit, a copper phase lead tab 14 having a faying surface 28 onto which the reaction material will be deposited is connected to the welding power supply by a work cable. The welding power supply may be constructed to deliver a direct current (DC) or an alternating current (AC) of sufficient strength through the reaction material electrode rod 22, which may be assigned either a negative polarity or a positive polarity, so that an arc can be struck between the reaction material electrode rod 22 and the copper phase lead tab 14 as will be further described below.

The reaction material composition incorporated into the reaction material electrode rod 22 may be a copper-based reaction material alloy such as a Cu—Ag—P braze composition that contains, on a weight percent basis, 70%-95% copper, 2%-20% silver, and 3%-8% phosphorus. Such a braze composition typically has a solidus temperature in the range of about 640° C.-650° C. and a liquidus temperature in the range of about 640° C.-820° C. For example, in a one specific embodiment, the Cu—Ag—P braze composition includes, on a weight percent basis, 80% copper, 15% silver, and 5% phosphorous, which provides the braze composition with a solidus temperature of about 644° C. and a liquidus temperature of about 805° C. The Cu—Ag—P braze composition, moreover, is self-fluxing, meaning that upon melting it removes oxides from the confronting phase lead tab surfaces and shields the welding region from atmospheric contamination—most notably the formation of oxide compounds in the deposited reaction material—because of the high affinity that phosphorus has for oxygen.

Figure 3:
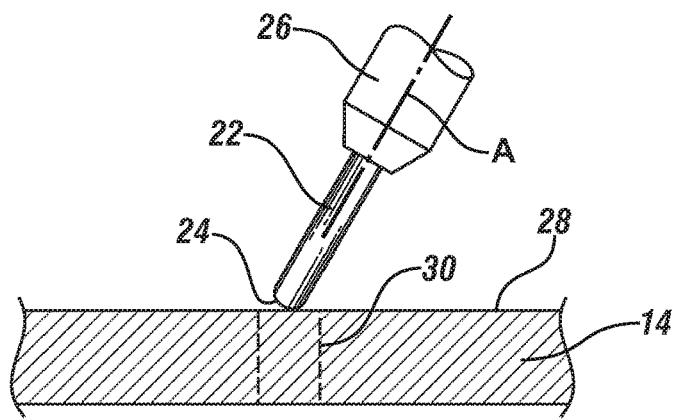
FIG. 3 is a cross-sectional illustration of a reaction material electrode rod that, during oscillating wire arc welding, has been brought into initial contact with a faying surface of a workpiece metal substrate.

Referring still to FIG. 3, the early phase of oscillating wire arc welding includes protracting the reaction material electrode rod 22 along its longitudinal axis A to bring the tip end 24 into contact with the faying surface 28 of the copper phase lead tab 14 at a deposition site 30. The longitudinal axis A of the reaction material rod 22 may be oriented normal to the faying surface 28 or, as shown, it may be inclined at an angle to facilitate access to the faying surface 28. Once the tip end 24 of the reaction material electrode rod 22 makes contact with the faying surface 28, the welding power supply is turned on and current is applied and passed through the electrode rod 22 at an initial level, for example about 100 A to about 200 A when the electrode rod 22 has a diameter of about 1.0 mm. A specific applied current level that may be used in many instances under these circumstances is 105 A.

Figure 4:
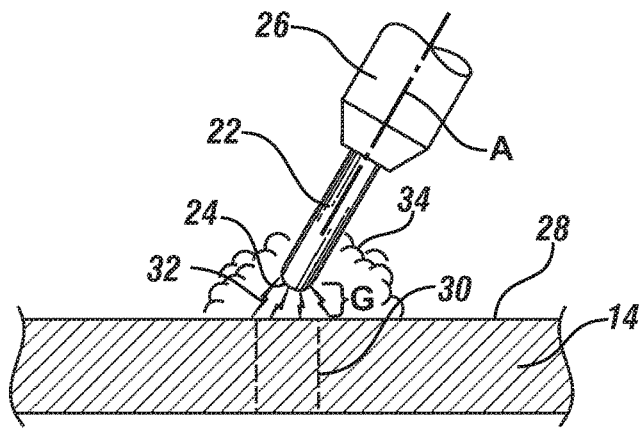
FIG. 4 is a cross-sectional illustration of a reaction material electrode rod that, during oscillating wire arc welding, has been retracted from the substrate faying surface, after making initial contact with that surface, to strike an arc.

After contact is established between the tip end 24 and the faying surface 28 and current is flowing, the reaction material electrode rod 22 is retracted from the faying surface 28 of the phase lead tab 14 along its longitudinal axis A, as shown in FIG. 4, typically to a pre-set distance away from the faying surface 28. For example, the reaction material electrode rod 22 may be retracted to a distance of about 1 mm to about 2 mm away from the faying surface 28 over a period of 2 ms to 5 ms. The retraction of the reaction material electrode rod 22 results in the tip end 24 of the rod 22 being displaced from the faying surface 28 by a gap G that is initially equal to the pre-set retraction distance. The ensuing electrical potential difference between the separated parts causes an arc 32 to be struck across the gap G and between the tip end 24 of the rod 22 and the faying surface 28 of the tab 14. The arc 32 heats the resistive tip end 24 and initiates melting of the reaction material electrode rod 22 at that location. A shielding gas—usually comprised of argon, helium, carbon dioxide, or mixtures thereof—may applied at the deposition site 30 to provide for a stable arc 32 and to establish a protective zone 34 that prevents atmospheric oxygen from contaminating the melting reaction material.

Figure 5:
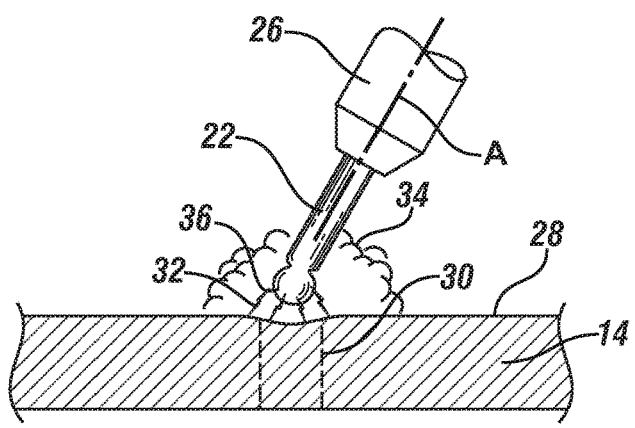
FIG. 5 is a cross-sectional illustration of a molten droplet of reaction material that, during oscillating wire arc welding, has formed at the tip of the reaction material electrode rod due to the heat generated by the arc.

The melting of the reaction material electrode rod 22 by the arc 32 causes a molten reaction material droplet 36 to collect at the tip end 24 of the electrode rod 22, as depicted in FIG. 5. This droplet 36, which is retained by surface tension, grows in volume and becomes further displaced from the faying surface 28 after the rod has been retracted to its pre-set distance as a result of the reaction material electrode rod 22 being consumed and the leading tip end 24 receding up the longitudinal axis A of the rod 22. The size of the gap G thus increases, usually to between 4 mm and 7 mm, as the arc 32 melts and consumes the reaction material electrode wire 22 so as to grow the molten reaction material droplet 36. Indeed, during the time the molten reaction material droplet 36 is being grown, the reaction material electrode rod 22 may be held stationary or it may be protracted towards the faying surface 28 at a slower rate than the rate at which the electrode rod 22 is being consumed in order to afford some control over the growth rate of the molten reaction material droplet 36 and the rate at which the gap G is increasing. During the time in which the molten reaction material droplet 36 is being grown, the applied current is preferably, but not necessarily, kept at the initial level (e.g., about 100 A to about 200 A for a 1.0 mm diameter electrode material rod).

In circumstances when the reaction material electrode rod 22 is protracted towards the faying surface 28 during growth of the molten reaction material droplet 36 (yet the molten reaction material droplet 36 is actually moving away from the faying surface 28 along the longitudinal axis A), the electrode rod 22 may be protracted at a programmed velocity over a specified time period while maintaining the applied current at the initial level. For example, in one embodiment, in which the reaction material electrode rod 22 has a diameter of about 1.0 mm, the rod 22 is protracted at a nominal velocity of about 100 ipm (inches per minute) to 180 ipm for a time of about 25 ms to about 75 ms while maintaining an applied current of about 100 A to about 200 A. Some specific parameters that tend to result in stable and controlled growth of the droplet 36 include protracting the reaction material electrode rod 22 at nominal velocity of 140 ipm over a period of 40 ms while maintaining an applied current of 105 A.

Figure 6:
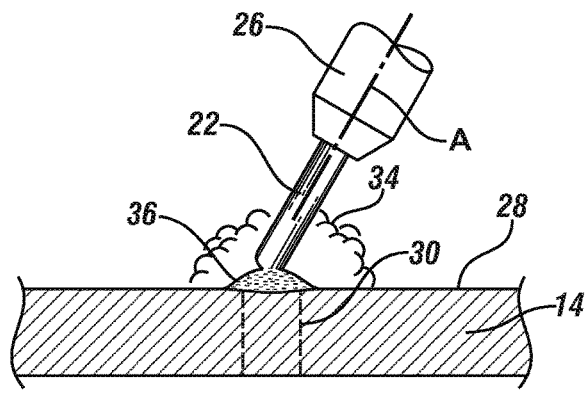
FIG. 6 is a cross-sectional illustration of the molten reaction material droplet in FIG. 5 being brought into contact with the substrate faying surface during oscillating wire arc welding.

Once the molten reaction material droplet 36 has formed and attained a desired volume, the electrode material rod 22 is protracted along its longitudinal axis A to bring the molten material droplet 36 into contact with the faying surface 28 of the phase lead tab 14, as shown in FIG. 6. The protracting forward movement of the electrode material rod 22, which reduces the size of and eventually eliminates the gap G, is carried out at a programmed velocity that is greater than the programmed velocity at which the rod 22 is protracted towards the faying surface 28 during growth of the molten reaction material droplet 36 (if the latter recited optional protraction is practiced). The reaction material electrode rod 22 may, for example, be protracted toward the faying surface 28 at a velocity of about 250 ipm to about 700 ipm. Moreover, during protraction of the reaction material electrode rod 22 and droplet 36 towards the faying surfaced 28, the applied current is reduced from the initial level by about 50% to about 75% to an intermediate level, which would be about 25 A to about 100 A for the exemplary 1.0 mm diameter rod having an initial current level of about 100 A to about 200 A described above. In one specific implementation, the reaction material electrode rod 22 is protracted along the longitudinal axis A towards the faying surface 28 at a velocity of about 600 ipm, while an applied current of about 40 A is maintained, until the reaction material droplet 36 comes into contact with the faying surface 28.

The eventual convergence of the molten reaction material droplet 36 and the phase lead tab 14 as a result of the forward protracting movement of the rod 22 extinguishes the arc 32, at which point the current applied from the welding power supply is increased from the intermediate level to a short level that is about 125% to about 150% of the initial level. That would mean, for example, that the applied current would be increased to about 125 A to about 300 A, based on the exemplary initial current level values recited above for a 1.0 mm diameter rod. Specifically, in a preferred application, the applied current is raised from the intermediate level employed during the forward protracting movement of the reaction material electrode rod 22 that brings the reaction material droplet 36 into contact with the faying surface 28 to a short level of about 200 A.

The localized exposure of the phase lead tab 14 to the molten reaction material droplet 36 imparts little to no thermal damage to the faying surface 28 surrounding the deposition site 30. Nor does it significantly thermally degrade the nearby enamel insulation and/or polymer material of the polymer ring carriers 16, 18. Indeed, as already mentioned, the liquidus temperature of the reaction material is much lower than the melting point of the copper phase lead tab 14—the liquidus temperature of the 80Cu-15Ag-5P reaction material alloy previously recited is about 805° C. while the melting point of copper is about 1084° C. Moreover, the initial applied current level that strikes the arc 32 can be set within a range that will not significantly heat the tip end 24 of the reaction material electrode rod 22 in substantial excess of its liquidus temperature. And although not shown here, the phase lead tab 14 may also be optionally cooled by external mechanisms (e.g., water cooling), which can be easily practiced in conjunction with oscillating wire arc welding since, here, the freedom and flexibility exists to independently practice oscillating wire arc welding with its own dedicated equipment.

Figure 7:
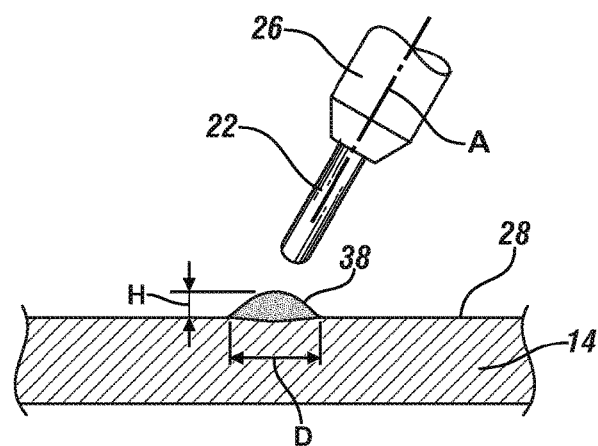
FIG. 7 is a cross-sectional illustration of a reaction material deposit after the reaction material electrode rod has left behind a molten reaction material droplet that later solidified.

After the molten reaction material droplet 36 has been placed onto the faying surface 28 of the phase lead tab 14, and the applied current increased to the short level, the reaction material electrode rod 22 is once again retracted, as shown in FIG. 7. Retraction of the electrode rod 22 transfers the molten reaction material droplet 36 to the faying surface 28. Such detachment and transfer of the molten reaction material droplet 36 is believed to be aided in part by the increase in the applied current after the droplet 36 is brought into contact with the faying surface 28. That is, the increase in the applied current from its intermediate level to its short level helps detach the molten reaction material droplet 36 by ensuring that any surface tension that may be acting to hold the molten reaction material droplet 36 onto the electrode material rod 22 is overcome. The refraction of the reaction material electrode rod 22 away from the faying surface 28 at this stage of the process is preferably carried out at a programmed velocity that is greater than the than the programmed velocity at which the rod 22 is protracted towards the faying surface 28 in order to bring the molten reaction material droplet 36 into contact with the faying surface 28. The reaction material electrode rod 22 may, for example, be retracted at a nominal velocity of about 900 ipm to about 1300 ipm at this time while maintaining an applied current at the short level.

The molten reaction material droplet 36 transferred to the faying surface 28 through a single cycle of oscillating wire arc welding, as just described, may be sufficient in some circumstances from a size, shape, and quantity standpoint. In other circumstances, however, it may be desirable to carry out one or more additional oscillating wire arc welding cycles at the same deposition site 30. Performing one or more additional oscillating wire arc welding cycles at the same deposition site 30 allows various aspects of the molten reaction material droplet 36 that is transferred to the faying surface 28 of the phase lead tab 14 to be managed. The volume, shape, and internal consistency of the transferred molten reaction material droplet 36 are just some examples of the various aspects that can be adjusted with the practice of additional oscillating wire arc welding cycles.

In one embodiment, for example, after the reaction material electrode rod 22 is retracted from the faying surface 28 and the molten reaction material droplet 36 is transferred, thus completing the first oscillating wire arc welding cycle, a second oscillating wire arc welding cycle may be performed. In particular, the applied current provided by the welding power supply may be returned to the initial level and an arc 32 may once again be struck across the gap G between the tip end 24 of the reaction material electrode rod 22 and the faying surface 28 (which now includes the deposited reaction material droplet). The resultant heating of the reaction material electrode rod 22 causes another molten reaction material droplet 36 to collect at the tip end 24 of the electrode rod 22. Eventually, the reaction material electrode rod 22 is again protracted along its axis A at the reduced intermediate applied current level to join the molten reaction material droplet 36 held by the tip end 24 of the electrode 22 with the deposited molten material droplet already on the faying surface 28 of the phase lead tab 14. The reaction material electrode rod 22 may then be retracted along its longitudinal axis A at the applied short current level to facilitate transfer of the second molten reaction material droplet 36, which completes the second oscillating wire arc welding cycle.

The molten reaction material that is transferred from the reaction material electrode rod 22 to the phase lead tab 14 (through one or multiple oscillating wire arc welding cycles) eventually solidifies into a reaction material deposit 38. The reaction material deposit 38, which is depicted in FIG. 7, is adhered to the faying surface 28 of the phase lead tab 14 essentially by way of a braze joint since the underlying faying surface 28 of the tab 14 did not melt during deposition and solidification of the molten reaction material droplet 36. While the reaction material deposit 38 can assume a wide variety of sizes and shapes, it preferably has a height H and a mean base diameter D in which an aspect ratio of the height H to the base diameter D is 0.5 or greater. The term "height" as used herein refers to the maximum distance the reaction material deposit 38 ascends above the faying surface 28 of the phase lead tab 14. The term "base diameter" as used herein refers to the diameter of the reaction material deposit 38 taken in the plane of the faying surface 28 of the phase lead tab 14. In one particular example, the reaction material deposit 38 is generally rounded in cross-sectional profile and has a height H of about 0.5 mm to about 1.0 mm and a diameter D of about 1.0 mm to about 2.0 mm.

Transferring and depositing the molten reaction material droplet 36 onto the faying surface 28 of the phase lead tab 14 to ultimately form the reaction material deposit 38 can be carried out with the reaction material electrode rod 22 being assigned either a negative polarity or a positive polarity relative to the tab 14. It has been found, however, that the two polarity designations, each of which is acceptable in practice, can affect the properties of the molten reaction material droplet 36 and the reaction material deposit 38 derived from the droplet 36. For instance, when the reaction material electrode rod 22 is assigned a positive polarity, the reaction material deposit 38 is generally smaller in size and weighs less than if the rod 22 is assigned a negative polarity and identically programmed applied currents, times, and rod velocities are employed. A reaction material electrode rod 22 assigned a positive polarity also generally produces a reaction material deposit 38 having a greater shear strength— which is the measure of how much force it takes to shear the reaction material deposit 38 off of the faying surface 28—than a rod 22 assigned a negative polarity for the same set of process parameters. Furthermore, a reaction material electrode rod 22 assigned a positive polarity typically produces reaction material deposits 38 that exhibit less relative variation in shear strength when deposited on a variety of clean and unclean faying surfaces 28.

Figure 8:
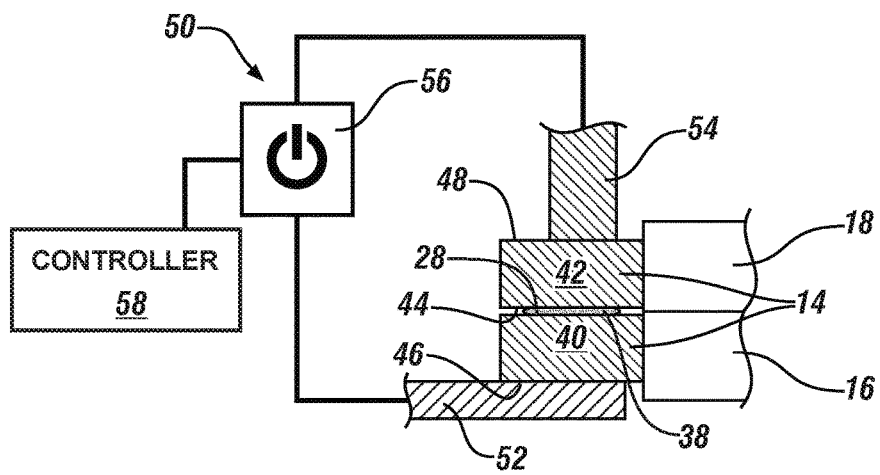
FIG. 8 is schematic illustration of a process for performing reaction metallurgical joining of two metal workpiece substrates.

The phase lead tab 14 is now ready for reaction metallurgical joining. Referring now to FIG. 8, the copper phase lead tab 14, which supports the reaction material deposit 38 on its faying surface 28, is facially aligned with another copper phase lead tab 14. The phase lead tab 14 that supports the reaction material deposit 38 is hereafter referred to as the "first phase lead tab 40" and the other phase lead tab is hereafter referred to as the "second phase lead tab 42" to distinguish them from each other in the following discussion. When aligned and stacked for reaction metallurgical joining, the faying surface 28 of the first phase lead tab 40 confronts a faying surface 44 of the second phase lead tab 42, and the reaction material deposit 38 extends between, and makes contact with, each of the faying surfaces 28, 44. More than one such reaction material deposit 38 may be disposed between the phase lead tabs 40, 42 in this way if desired. The first and second phase lead tabs 40, 42, moreover, also include exposed exterior surfaces 46, 48 that face in the opposite directions from their respective faying surfaces 28, 44, An apparatus 50 for carrying out the reaction metallurgical joining process of the first and second phase lead tabs 40, 42 is shown schematically in FIG. 8 and includes a first electrode 52, a second electrode 54, a power source 56, and a controller 58. The first and second electrodes 52, 54 are positioned to make direct contact or indirect contact (i.e., contact through an intermediate member) with the exterior surfaces 46, 48 of the first and second phase lead tabs 40, 42, respectively, and to apply pressure to each exterior surface 46, 48. The electrodes 52, 54 are constructed from an electrically conductive material such as a copper alloy including, for instance, a zirconium copper alloy (ZrCu) that contains about 0.10 wt. % to about 0.20 wt. % zirconium and the balance copper. The power source 56 electrically communicates with the first and second electrodes 52, 54 and supplies a current, preferably a DC current, for exchange between the electrodes 52, 54. The power supply 56 may be a medium-frequency DC (MFDC) power supply, which is commercially available from a number of suppliers including ARO Welding Technologies (US headquarters in Chesterfield Township, Mich.) and Bosch Rexroth (US headquarters in Charlotte, N.C.). The controller 58 interfaces with the power supply 56 and can be programmed to control its current output as needed.

The apparatus 50 supplies the heat and compression needed to effectuate the formation of a solid-state metallurgical joint between the faying surfaces 28, 44 of the first and second copper phase lead tabs 40, 42. To start, the first electrode 52 is brought into contact—preferably direct contact—with the exterior surface 46 of the first phase lead tab 40 and the second electrode 54 is brought into contact—preferably direct contact—with the exterior surface 48 of the second phase lead tab 42. When in contact with their respective exterior surfaces 46, 48, the two electrodes 52, 54 are facially aligned with each other and are positioned such that current will flow through the reaction material deposit 38 when being exchanged between the electrode weld faces. A weld gun or other mechanical apparatus that carries the electrodes 52, 54 is operated to clamp or converge the two electrodes 52, 54 to apply pressure to their respectively-engaged exterior surfaces 46, 48 (either one or both of the electrodes 52, 54 being mechanically moveable) and generate a compressive force on the tabs 40, 42. An electrical current delivered from the power supply 56 is then exchanged between the electrodes 52, 54 and through the phase lead tabs 40, 42. This electrical current passes through the reaction material deposit 38 located between the workpiece substrate faying surfaces 28, 44.

Because the reaction material is more thermally and electrically resistive than the two copper phase lead tabs 40, 42, and because the electrodes 52, 54 themselves are able to extract and sink heat as a consequence of being water-cooled, the passing electrical current generates heat that is largely confined within the reaction material deposit 38. Such localized heat generation can be managed by the controller 58 to heat the reaction material deposit 38 to above its solidus temperature—and even to above its liquidus temperature if desired—while still keeping the temperature of the reaction material deposit 38 below the melting point of the first and second copper phase lead tabs 40, 42. As a result, the reaction material deposit 38 melts partially or fully into a mobile liquid phase, and the copper phase lead tabs 40, 42 do not melt, even at and around their faying surfaces 28, 44 within the deposition site 30.

Upon being melted, the reaction material reacts with the faying surfaces 28, 44 of the first and second copper phase lead tabs 40, 42 and renders them suitable for coalescence. As alluded to before, the Cu—Ag—P reaction material alloy is also self-fluxing primarily because of its phosphorus component, which gives it the ability upon melting to remove oxides from the confronting faying surfaces 28, 44 and to shield the surrounding area from contamination by atmospheric oxygen. The electrical current being exchanged between the electrodes 52, 54 may be ceased after the reaction material deposit 38 is sufficiently melted while the pressure imparted by the electrodes 52, 54 to the phase lead tabs 40, 42 is continued. The compressive force applied by electrodes 52, 54, in turn, compresses the first and second phase lead tabs 40, 42 and squeezes the molten reaction material laterally along a faying interface of the tabs 40, 42 together with any reaction by-products that may have been produced. Eventually, the faying surfaces 28, 44 of the first and second phase lead tabs 40, 42 make contact and begin to coalesce under pressure. The contacting coalescing portions of faying surfaces 28, 44 become joined soon after the molten reaction material is expelled from the faying interface to establish a solid-state metallurgical joint between the phase lead tabs 40, 42. This joint is composed mainly of copper derived from the first and second phase lead tabs 40, 42 themselves, making it structurally sound and minimally disruptive to the functionality of the tabs 40, 42.

EXAMPLES

A series of reaction material pre-placement experiments was conducted in accordance with the above description. Specifically, four pre-placement process variations were established, and a number of experiments were conducted in each variation. The reaction material electrode rod used in each experiment across all variations was a 1.0 mm diameter reaction material electrode rod composed of 78 wt. % Cu, 15 wt. % Ag, and 7 wt. % P. Copper coupon samples were also used in each experiment across all variations as representative metal workpiece substrates. The oscillating wire arc welding procedure used in each pre-placement experiment was generally the same in terms of protraction and retraction of the Cu—Ag—P electrode rods as is further described below. The differences that define the four process variations related to electrode rod polarity and the surface cleanliness of the copper coupon samples.

In each of the four variations, the reaction material electrode rod was brought into contact with the copper coupon sample and an initial current level of 105 was applied and passed through the rod. Next, the electrode rod was retracted to a pre-set distance of between 1 mm and 2 mm over a period of 2.5 ms. This retraction caused an arc to be struck between the leading tip end of the electrode rod and the surface of the copper coupon sample which, in turn, caused the tip end of the electrode rod to melt. Following retraction of the reaction material electrode rod to the pre-set distance, the electrode rod was protracted towards the copper coupon sample at a nominal velocity of 140 ipm over a period of 40 ms while maintaining an applied current of 105 A. During this time, a molten reaction material droplet grew and actually receded up the electrode rod and away from the copper coupon sample since the consumption rate of the rod was greater than the velocity at which the rod was being protracted towards the copper coupon sample. Next, the applied current was reduced to an intermediate current of 40 A and the electrode rod was protracted towards the coupon sample at a velocity of 600 ipm until the molten reaction material droplet held on the tip end of the rod made contact with the coupon sample. At this time the applied current was increased to a short level of 200 A. The electrode rod was then retracted away from the copper coupon sample at a velocity of 1180 ipm while maintaining the applied current of 200 A, leaving behind a molten reaction material on the surface of the copper coupon sample that eventually solidified into a reaction material deposit.

As indicated above, the differences between the four experimental process variations involved the polarity of the Cu—Ag—P electrode rod and the cleanliness of the surface of the copper coupon sample onto which the reaction material deposit was made. The four process variations used either a negative or positive polarity reaction material electrode rod to deposit the reaction material onto either a clean or oxidized surface of the copper coupon sample. The "clean" surface was cleaned to the point of being essentially a pure copper contact surface, while the "oxidized" surface had a purplish layer of oxide produced by prior thermal exposure. Multiple runs were conducted in each of the four process variations, which are characterized below in Table 1.

TABLE 1

| Process Variation | Electrode Rod Polarity | Surface Cleanliness |
| --- | --- | --- |
| 1 | Negative | Oxidized |
| 2 | Negative | Clean |
| 3 | Positive | Oxidized |
| 4 | Positive | Clean |

The data obtained from the four experimental process variations is tabulated below in Table 2. As can be seen, the weight and the shear strength of the reaction material deposit for each single-cycle pre-placement experiment was measured across all four process variations. The "Pos. X" and "Pos. Y" columns in Table 2 merely indicate the variation of the centerline of the deposit in the x-y plane relative to a fixed target centerline. From the tabulated data, it is noticeable that the weight of the reaction material deposit was generally less when the reaction material electrode rod had a positive polarity, yet the shear strength of the smaller deposits was generally greater. It is also noticeable that the reaction material deposits showed less relative variation in shear strength across clean and oxidized surfaces when the reaction material electrode rod had a positive polarity. As such, while the reaction material deposits obtained from both positive and negative rod polarities demonstrated good shear strength, the deposits obtained from the positive polarity electrode material rods generally demonstrated better adhesion on a strength-to-weight ratio basis and were more insensitive to surface cleanliness.

TABLE 2

| Run | Polarity of Rod | Faying Surface Condition | Energy (joules) | Deposit Weight (mg) | Shear strength (N) | Pos. X (mm) | Pos. Y (mm) |
| --- | --- | --- | --- | --- | --- | --- | --- |
| 1 | neg | Oxidized | 122.9 | 45 | 304 | 1.10 | −0.69 |
| 2 | neg | Oxidized | 124.3 | 45 | 188 | 0.38 | −0.93 |
| 3 | neg | Oxidized | 121.3 | 42 | 61 | 0.23 | −0.57 |
| 4 | neg | Oxidized | 117.2 | 44 | 135 | 0.23 | −0.67 |
| 5 | neg | Oxidized | 122.1 | 34 | 122 | 1.03 | −0.85 |
| 6 | neg | Clean | 121.1 | 41 | 444 | 0.93 | −0.31 |
| 7 | neg | Clean | 122.1 | 45 | 134 | −0.03 | 0.08 |
| 8 | neg | Clean | 120.3 | 39 | 331 | 0.61 | −0.83 |
| 9 | neg | Clean | 118.2 | 41 | 425 | 1.18 | −0.11 |
| 10 | pos | Oxidized | 124.8 | 34 | 545 | −0.27 | 0.53 |
| 11 | pos | Oxidized | 119.7 | 33 | 452 | −0.06 | 0.79 |

TABLE 2-continued

| Run | Polarity of Rod | Faying Surface Condition | Energy (joules) | Deposit Weight (mg) | Shear strength (N) | Pos. X (mm) | Pos. Y (mm) |
| --- | --- | --- | --- | --- | --- | --- | --- |
| 12 | pos | Oxidized | 120.9 | 29 | 777 | −0.41 | 0.58 |
| 13 | pos | Oxidized | 126.8 | 31 | 715 | 0.13 | 0.99 |
| 14 | pos | Oxidized | 123.9 | 33 | 602 | −0.11 | 1.22 |
| 15 | pos | Clean | 127.5 | 20 | 1405 | −0.26 | 0.82 |
| 16 | pos | Clean | 124.3 | 33 | 327 | 0.62 | 0.00 |
| 17 | pos | Clean | 127.4 | 30 | 647 | 0.57 | 1.03 |

The method of pre-placing a reaction material for eventual participation in reaction metallurgical joining has just been described in the context of copper phase lead tabs of an electric motor stator. Other types of copper or copper-based workpiece substrates—as well as non-copper metal workpiece substrates—can of course experience similar pre-placement of a suitable reaction material, as will be appreciated by skilled artisans. As such, the above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of performing reaction metallurgical joining, the method comprising:
   using oscillating wire arc welding to adhere a reaction material deposit onto a faying surface of a first metal workpiece substrate at a deposition site, the use of oscillating wire arc welding involving transferring a molten reaction material droplet from a leading tip end of a consumable reaction material electrode rod onto the faying surface and allowing the droplet to solidify into the reaction material deposit;
   pressing the first metal workpiece substrate and a second metal workpiece substrate together such that the reaction material deposit contacts and extends between the faying surface of the first metal workpiece, onto which the reaction material deposit is adhered, and a confronting faying surface of the second metal workpiece; and
   heating the reaction material deposit while the first and second metal workpiece substrates are being pressed together to melt the reaction material deposit between the confronting faying surfaces of the first metal workpiece substrate and the second metal workpiece substrate, neither the first metal workpiece substrate nor the second metal workpiece substrate being melted during heating of the reaction material deposit, and wherein pressing the first and second metal workpiece substrates together and heating the reaction material deposit results in a solid-state metallurgical joint being formed between the faying surfaces of the first and second metal workpiece substrates.

2. The method set forth in claim 1, wherein the first metal workpiece substrate is composed of copper or a copper alloy, and wherein the second metal workpiece substrate is composed of copper or a copper alloy.

3. The method set forth in claim 2, wherein each of the first metal workpiece substrate and the second metal workpiece substrate is a phase lead tab of an electric motor stator.

4. The method set forth in claim 2, wherein the reaction material electrode rod comprises a Cu—Ag—P reaction material alloy.

5. The method set forth in claim 4, wherein the Cu—Ag—P reaction material alloy contains, on a weight percent basis, 70%-95% copper, 2%-20% silver, and 3%-8% phosphorus.

6. The method set forth in claim 1, wherein pressing the first metal workpiece substrate and a second metal workpiece substrate together comprises:
contacting the first metal workpiece substrate with a first electrode and contacting the second metal workpiece substrate with a second electrode, the first and second electrodes being axially facially aligned with each other and being positioned so that current will flow through the reaction material deposit when exchanged between the electrodes; and
applying a compressive force to the first and second metal workpiece substrates through the application of pressure by the first electrode and the second electrode on the first metal workpiece substrate and the second metal workpiece substrate, respectively.

7. The method set forth in 1, wherein heating the reaction material deposit comprises:
passing an electric current through the reaction material deposit to resistively heat the reaction material deposit.

8. The method set forth in claim 1, wherein using oscillating wire arc welding to adhere a reaction material deposit onto a faying surface of a first metal workpiece substrate comprises:
(a) bringing the leading tip end of the consumable reaction material electrode rod into contact with the faying surface of the first metal workpiece substrate;
(b) passing electric current through the consumable reaction material electrode rod while the leading tip end of the electrode rod is in contact with the faying surface;
(c) retracting the consumable reaction material electrode rod away from the faying surface of the first metal workpiece substrate to thereby strike an arc across a gap formed between the consumable reaction material electrode rod and the faying surface, the arc initiating melting of the leading tip end of the consumable reaction material electrode rod;
(d) protracting the consumable reaction material electrode rod forward to close the gap and bring the molten reaction material droplet that has formed on the leading tip end of the electrode rod into contact with the faying surface of the first metal workpiece substrate, the contact between the molten reaction material droplet and the faying surface extinguishing the arc; and
(e) retracting the consumable reaction material electrode rod away from the faying surface to transfer the molten reaction material droplet from the leading tip end of the electrode rod to the faying surface of the first metal workpiece substrate, the molten reaction material droplet transferred to the faying surface of the first metal workpiece substrate solidifying into the molten reaction material deposit.

9. The method set forth in claim 8, wherein the electric current is passed at an initial level when the leading tip end of the consumable reaction material electrode rod is first brought into contact with the faying surface of the first metal workpiece substrate.

10. The method set forth in claim 9, wherein the electric current is passed at an intermediate level when the consumable reaction material electrode rod is protracted toward the faying surface to bring the molten reaction material droplet into contact with the faying surface, the intermediate level of applied current being less than the initial level.

11. The method set forth in claim 10, wherein the intermediate level of the electric current is 50% to 75% of the initial level.

12. The method set forth in claim 9, wherein the electric current is passed at a short level once the molten reaction material droplet is brought into contact with the faying surface of the first metal workpiece substrate and the arc is extinguished, the short level being greater than the initial level.

13. The method set forth in claim 12, wherein the short level of the electric current is 125% to 150% of the initial level.

14. The method set forth in claim 8, wherein steps (a) through (e) are repeated at least once to increase the size of the molten material droplet on the faying surface of the first metal workpiece substrate.

15. The method set forth in claim 8, wherein the consumable reaction material electrode rod has a positive polarity throughout steps (a) through (e).

16. A method comprising:
providing a first metal workpiece substrate having a faying surface;
performing a first oscillating wire arc welding cycle to transfer a molten reaction material droplet from a consumable reaction material electrode rod onto the faying surface of the first metal workpiece substrate, the first oscillating wire arc welding cycle comprising:
bringing a leading tip end of the consumable reaction material electrode rod into contact with the faying surface of the first metal workpiece substrate;
applying an electric current through the consumable reaction material electrode rod at an initial level while the leading tip end of the electrode rod is in contact with the faying surface;
retracting the consumable reaction material electrode rod away from the faying surface of the first metal workpiece substrate to thereby strike an arc across a gap formed between the consumable reaction material electrode rod and the faying surface, the arc melting the leading tip end of the consumable reaction material electrode rod to form the molten reaction material droplet;
applying the electric current through the consumable reaction material electrode rod at an intermediate level, which is less than the initial level, while the molten reaction material droplet is spaced apart from the faying surface by the gap;
protracting the consumable reaction material electrode rod forward to bring the molten reaction material droplet into contact with the faying surface of the first metal workpiece substrate, the contact between the molten reaction material droplet and the faying surface extinguishing the arc;
applying the electric current through the consumable reaction material electrode rod at a short level, which is greater than the initial level, once the molten electrode material droplet at the leading tip end of the consumable reaction material electrode rod is in contact with the faying surface;
retracting the consumable reaction material electrode rod away from the faying surface to transfer the molten reaction material droplet from the leading tip end of the electrode rod to the faying surface of the first metal workpiece substrate; and
allowing the molten reaction material droplet transferred to the faying surface of the first metal workpiece substrate to solidify into a reaction material deposit that is adhered to the faying surface of the first metal workpiece substrate.

17. The method set forth in claim 16, wherein the first metal workpiece substrate is composed of copper or a copper alloy, wherein the second metal workpiece substrate is composed of copper or a copper alloy, and wherein the consumable reaction material electrode rod comprises a copper-based reaction material alloy.

18. The method set forth in claim 17, further comprising:
providing a second metal workpiece substrate having a second faying surface that confronts the first faying surface of the first metal workpiece substrate;
contacting the first metal workpiece substrate with a first electrode and contacting the second metal workpiece substrate with a second electrode, the first and second electrodes being axially facially aligned with each other and being positioned so that current will flow through the reaction material deposit when exchanged between the electrodes;
applying a compressive force to the first and second metal workpiece substrates through the application of pressure by the first electrode and the second electrode on the first metal workpiece substrate and the second metal workpiece substrate, respectively, such that the reaction material deposit contacts and extends between the faying surface of the first metal workpiece, onto which the reaction material deposit is adhered, and the second faying surface of the second metal workpiece substrate; and
passing an electric current between the first and second electrodes and through the reaction material deposit to resistively heat and melt the reaction material deposit without melting the first metal workpiece substrate or the second metal workpiece substrate, and wherein applying a compressive force to the first and second metal workpiece substrates and heating the reaction material deposit results in a solid-state metallurgical joint being formed between the faying surfaces of the first and second metal workpiece substrates.

19. The method set forth in claim 16, wherein the consumable reaction material electrode rod has a positive polarity.

20. The method set forth in claim 16, wherein a second oscillating wire arc welding cycle is performed to increase the size of the molten reaction material droplet on the faying surface of the first metal workpiece substrate.

\* \* \* \* \*